(12) United States Patent
Al-Mutawa

(10) Patent No.: US 8,547,250 B1
(45) Date of Patent: *Oct. 1, 2013

(54) TRAFFIC SAFETY SYSTEM

(71) Applicant: Mahmoud E. T. H. Al-Mutawa, Safat (KW)

(72) Inventor: Mahmoud E. T. H. Al-Mutawa, Safat (KW)

(*) Notice: Subject to any disclaimer, the term of this patent is extended or adjusted under 35 U.S.C. 154(b) by 0 days.

This patent is subject to a terminal disclaimer.

(21) Appl. No.: 13/692,838

(22) Filed: Dec. 3, 2012

Related U.S. Application Data

(63) Continuation of application No. 13/536,839, filed on Jun. 28, 2012, now Pat. No. 8,344,864.

(51) Int. Cl.
*G08G 1/16* (2006.01)

(52) U.S. Cl.
USPC ........................................... 340/903

(58) Field of Classification Search
USPC ............... 340/435, 502, 901, 907, 933, 936, 340/988, 995.13; 701/117
See application file for complete search history.

(56) References Cited

U.S. PATENT DOCUMENTS

| 4,591,823 A * | 5/1986 | Horvat ........................... 340/936 |
| 7,706,967 B2 * | 4/2010 | Knockeart et al. ............ 701/119 |
| 2006/0095199 A1 * | 5/2006 | Lagassey ...................... 701/117 |
| 2008/0140305 A1 * | 6/2008 | Kim et al. ...................... 701/117 |
| 2008/0186205 A1 * | 8/2008 | Breed ........................... 340/901 |
| 2009/0322561 A1 * | 12/2009 | Morioka et al. .............. 340/907 |

OTHER PUBLICATIONS

Prior art cited in U.S. Appl. No. 13/536,839, filed Jun. 28, 2012, the priority of which is claimed herein.

* cited by examiner

*Primary Examiner* — Phung Nguyen
(74) *Attorney, Agent, or Firm* — Richard C. Litman

(57) ABSTRACT

The traffic safety system includes a comprehensive control server with a mass storage unit, a main data collector with a main data collection mass storage unit, and a sub data collector with a sub-data storage unit. Also included are vehicle embedded sensors and embedded sensors disposed in various infrastructure components such as roadways, traffic lights street lamps, and the like. All sensors are in network communication with the control server, main and sub data collectors. The control server, main and sub data collectors are all in operable communication with each other via the same network communications infrastructure. This networked system monitors and controls vehicle activity on roads equipped with the embedded sensors. The system generates alerts, which are sent to drivers warning them of laws, which are applicable to the controlled roadways. Without human intervention, the control system autonomously enforces road activity that is compliant with the applicable roadway laws.

20 Claims, 12 Drawing Sheets

TRAFFIC SAFETY SYSTEM

CROSS-REFERENCE TO RELATED APPLICATIONS

This is a continuation of my prior application Ser. No. 13/536,839, filed Jun. 28, 2012, now U.S. Pat. No. 8,344,864, issued Jan. 1, 2013.

BACKGROUND OF THE INVENTION

1. Field of the Invention

The present invention relates generally to automated traffic controls, and particularly to a traffic safety system that provides an automated system for ensuring traffic safety and control without human intervention.

2. Description of the Related Art

Traffic safety has become an urgent need and key goal that many countries are trying to achieve after they have realized the risk of human casualties and economic losses they are suffering because of traffic accidents, which have become a problem in most of developed and developing countries. Statistics we occasionally get from the traffic administration are catastrophic. The numbers of dead, injured people, and damaged cars are alarming, and call for the necessity to stop the continuous bleeding of casualties resulting from the lack of safe driving restraints and the consequences of not abiding to them, such as speeding, reckless driving, not wearing seatbelts, passing red lights, and other violations of traffic regulations. All these are mistakes that lead to tragedies and grief, which have negative effects on the families and community. There are root causes for traffic accidents for all road users, whether private or public transportation is utilized.

Car accidents considered today are a frightening specter that terrorizes people. Moreover, these accidents threaten the safety of surrounding lives. We see in monthly statistics that numbers tend to increase over the years because of weak preventive measures and traffic chaos.

Traffic chaos has become the special feature of our daily lives. Lack of traffic awareness for most drivers in general is a major reason. The reasons for these accidents, at least the most important ones, are as follows. Misbehavior of road users, whether a driver or a pedestrian, is one reason. This mistake is caused by the lack of good orientation of the driver as for the conduct and technical aspects to control the vehicle, and how to deal with a variety of road users. The road is the second reason for accidents. When a road has no traffic safety requirements, safe passage for the road users day and night, and in all weather conditions is a major factor in making accidents.

The third reason is the vehicle itself, when a driver does not check his vehicle to make ensure the safety and validity of all of its components, especially those related to safety, such as brakes, wheels, lights and windshield wipers. This specifically applies to long distance trips and to desolate areas.

Thus, it becomes necessary to avoid these deadly mistakes and protect innocent lives, which have been lost without any fault or crime on their part, all because of carelessness and recklessness of some people to the lives of others that have the right to share the road.

Therefore, the vehicle should be technically ready and contain all safety requirements as the vehicle is considered the third cause of accidents as to importance in traffic accidents. It is very important for vehicles, no matter what they are, to be equipped with all technical specifications that enable it to use the roads and to achieve all safety requirements to protect passengers and all pedestrians on the road.

It is important when renewing the yearly car registration license to thoroughly check them not only formally, but to make sure these specifications are provided and not to grant these permits until all damages have been fixed. It is also important to watch vehicles on the roads and detain all vehicles working in violation to these conditions. Car inspections should be comprehensive and not partial (engine! brakes! wipers! wheels! seatbelt, etc.). Citizens should get used to abide by these instructions individually and willingly.

When looking into traffic accidents and their causes, one should look into what is a traffic accident starting with the definition: "Every event resulting in a death, injury or loss of properties without prior intention and caused by vehicles or their content while moving, including fire accidents during the vehicle's movement on the public road".

In order to consider a traffic accident is really an accident, the following elements should be available. The damage: it could be financial such as losses in properties, whether public or private. It could also be physical such as all kinds of human injuries or deaths, whether a death directly after the accident or after some time without specification. The vehicle: and it means here the vehicle as driver, passengers and load. Unintentional action that is very important because otherwise it would mean committing a crime. Vehicle's movement when moving on the public road, it means that a car should be rolling on the main road because if the accident happens in a private place or while being stopped then it would become a criminal act and not a traffic accident. In case of a tree falling on an unmoving vehicle, then it is a fate. However, if the accident is between a vehicle in motion and another one that stopped, then it is definitely a traffic accident because one car is in motion.

Elements and types of the traffic accident: Every traffic accident contains the following three elements: Human, it includes the driver, passenger and pedestrian. Road, which is every place made for movement of vehicles, pedestrians or animals. Vehicle, it is the most important element of the traffic accident.

With regard to types of accidents, there are several classifications according to the country. Accidents are classified as follows: Collision accidents, between a vehicle and another, and hit accidents, between a vehicle and a fixed body. Exemplary reckless accidents are overturning of a vehicle due to tire explosions. Exemplary run over accidents include two types, e.g., of collision with human or collision with animal. Downfall accidents include the falling of a vehicle in the water. Fire accidents include the burning of the vehicle due to negligence of safety and security factors.

There are other types of accidents such as the serious accidents, which lead usually to death or severe bodily injuries in addition to the financial losses, the medium accidents, which result in injuries, and the small accidents, which do not result in human injuries, and where material losses are nearly non-existing. Causes of the traffic accidents include speeding, the main cause of traffic accidents leading to death of many people. Speeding may not be the only direct cause but high speed is one the factors that accelerate the incident and increase its severity. Negligence and carelessness, such as drivers being occupied while driving vehicles whether by the radio, the A/C, talking with passengers or using the mobile, or driving the vehicle carelessly and recklessly.

Drunkenness and drinking alcoholic or some drugs and medicine that leads to drowsiness. Violating the traffic rules and disrespecting the traffic laws and the instructions also lead to trouble on the roadway.

Lack of awareness with some people and their ignorance of traffic laws cause many accidents. Lack of durability and safety conditions in the vehicle are also factors. Not making a full stop upon exiting from the sub-street is culpable conduct. Non-existence of back signals in some vehicles, especially the old ones is also problematic. Driving some vehicles without holding a driver's license by under aged people, especially sons of senior officials and VIP as well as driving the vehicles by old people are causative of roadway problems. Wrong passing and changing lanes from one to another course in order to pass a slow vehicle, and love of adventure and drawing attention are also problematic behaviours.

It has been proved that traffic accident's factors are three; human, vehicle and road. Thus, any mistake, defect or miss judgment are most probably followed by a traffic accident. Researchers in traffic science agree that traffic accidents result from the three factors mentioned above (human, vehicle, and road) in addition to weather conditions and the surrounding environment.

The human factor is considered the main reason for traffic accidents as it was revealed that about 75-85% of accidents are caused by drivers, 8-10% cause by roads and 5-8% caused by vehicles themselves. Human is considered the first responsible for traffic accidents even if the cause was attributed to the vehicle or the road, since the driver's negligence and delinquency are the cause of the vehicle's failure resulting in the traffic accident and he is also the one responsible for the road's condition. Thus, the human element's responsibility has risen in theory to more than 95%. I will talk about this element in detail. The reasons related to the human factor include the driver, pedestrians and the passenger.

The driver is considered the main cause of accidents. He assumes the biggest responsibility of accidents because of mistakes he makes while driving. Some are direct causes where he could control them, such as violating traffic laws and regulations; others are indirect and hard to control, such as mental, health and social state, although it is recommended not to drive in these conditions. Among mistakes committed by drivers while driving are non-compliance to traffic laws and regulations while driving on roads. Excess speed, is one of the main causes of accidents resulting in severe damages.

Not leaving enough distance between the vehicles forms the highest percentage of the total causes of accidents. Not abiding to traffic lanes, driving in reverse, wrong over passing, and driving against the traffic are also major accident causes. Recklessness and inattention are due to driver's lack of concentration while driving the vehicle on the road (distraction) or diverting his attention to other things not related to driving such as looking at something or talking with someone while driving which may lead at the end to an inappropriate decision at an unfortunate moment. Thus, his reaction may come late or slow that will lead to the accident. For example, when a vehicle enters a roundabout with another vehicle in front of him, the driver's attention will be on the vehicles entering the roundabout from the left side, so he may collide with the vehicle in front of him that did not move. There are many other examples such as looking at one side while driving in a heavy traffic road and speed is very slow. In this case, any mental distraction or looking at the wrong side will definitely lead to an accident. In general, this type of accident represents a great percentage of the total accidents made in countries.

Failing to yield is also among important reasons that lead to accidents. Not making sure that the street is clear is due to two things: either the driver is distracted and busy and did not take the necessary precautions when entering a street or it is due to incompetence and lack of driving experience. It is important to mention that driver's mental distraction is usually due to tiredness and exhaustion because of long working hours, or driver's family, social and mental problems.

Misjudgment, due to driver's inexperience, incompetence and lack of traffic awareness, is among the reasons that cause a traffic accident that is most of the times catastrophic. All these reasons form the majority of the mistakes that have been done by the driver and that definitely cause accidents, injuries and deaths. This categorization made to the driver's mistakes is negotiable because the causes could be at the same time violating the traffic law and a misjudgment and recklessness from the driver. For example, driving in reverse is one of the reasons for a traffic accident; it could be a violation by the traffic law when going backward recklessly and it could be legal, but done without much attention.

Pedestrians are considered to be one of the main factors in accidents, especially run over accidents. Pedestrians make many mistakes resulting in traffic accidents such as: .Not abiding to areas specific for pedestrians, and not crossing the red light for pedestrians.

.Not using sidewalks, sometimes is not their mistake for many reasons such as piling sidewalks with products for sale, using sidewalks by owners of a mechanical workshop especially in industrial areas, lack of sidewalks or unpaved, sandy sidewalks. In these cases, pedestrians prefer to walk on the street and the responsibility is then on the competent authority.

Regarding lack of traffic awareness for pedestrians especially children; we should mention here that the driver is also responsible even indirectly for accidents made because a pedestrians' mistakes. When talking about children's mistakes, driver's responsibility becomes direct, as he should be aware of what is going on around him on roads and sidewalks and he should expect these mistakes. For example, the driver may notice a child playing with a ball on the sidewalk, thus he should slow down and take precautions, since the ball may escape from the boy's hands and go on the street and the boy may follow it without thinking of a passing car and the coming threat.

Among mistakes done by passengers we cite the following: Leaving the car in a wrong way; riding in open vehicles or the ones designed for products transportation in a wrong way; and distracting the driver's mind while driving.

Opening car's door in a wrong way is a mistake that can be done by both the driver and the passenger. This mistake has been considered in this category because the driver is usually more careful getting out of the vehicle than the passenger is.

The vehicle has an important role in preserving the road's safety. Therefore, many car companies make sure to invent cars serving the drivers in a safer way. Technical failure of a vehicle is an important factor in accidents and threats in general. Condition of the wheels, lights, brakes, and windshield wipers usually cause a catastrophe if one fails while driving.

The driver is usually the main responsible factor for accidents resulting of vehicle failure because of carelessness in taking care of the vehicle and regularly checking it.

Another important factor in accidents is the road itself. Many reasons cause accidents because of road conditions such as engineering defects in designing and executing the road.

Holes and air pockets. unpaved and unorganized roads despite the heavy traffic movement on them are a factor. Obstacles or strange objects on the street are also a contributor to accidents. Maintenance works and activities are another factor. Road types and its surrounding have an important effect in protecting road users especially if black dots are identified as the areas with the most traffic accidents. Engineering road design plays an important role in limiting road accidents, through the specifications of the path's width (group) and the road's shoulder width and type and the effect of crossroads on the street. Streets change, therefore the driver has to adjust with it according to its situations, which requires continuous attention; as the road is once straight, zigzag, or slippery, etc. Accidents also are frequent on highways as some drivers find it a great pleasure going over speed.

Weather factors cause yearly many accidents, human and financial losses. These factors are wind, sand storms, fog, frost rain and floods in winter with landslide resulting from them. Accidents occurred in rough roads are more than those in the flat lands. Accidents during rain, snow fog and dust are more than accident happening in normal conditions. Therefore, we find that in many countries weather forecast departments give daily guidance to drivers regarding travel on external roads outside the cities. Sometimes, we find that negligence of traffic officers is also a cause in accidents if he leaves his duty, in addition to lack or nonexistence of traffic lights on the outside roads.

There are also other traffic accidents such as collision and turnovers as a car might face on a road different cases and threats. Therefore, driver should be aware on how to react in these conditions. In addition, understanding the obstacle's nature helps in avoiding it.

Knowledge and culture are the most important aspects that affect the human and his cleverness. Cleverness is sometimes known as being able to act wisely, and at other times as the ability of understanding, intuition and concentration. Cleverness is related to traffic accidents as well, because if an individual could not act safely especially in surprise situations such as rush hours or traffic jams, in occasions, visits and others, he will directly and indirectly cause catastrophic, middle and simple accidents.

I find that safe and correct driving of vehicles will be achieved through a good understanding of traffic laws and regulations and applying them when confronting threats in a continuous correct way. Developing technical abilities that help avoiding awkward situations lead as well to a safe and civilized driving. Following good manners in driving protects humans from danger on the roads.

These manners should become an integral part of every driver's nature and not separate from driver's other personal characteristics and tendencies. Although automobile is a comfort tool, it has also become a curse since accidents have increased greatly with the increasing numbers of cars. The number of traffic accident victims has become much bigger than the number of victims caused by other causes.

Talking about traffic laws' establishment, which was derived from sources might explain the need for a new paradigm in traffic safety management.

With the car's invention, many problems have emerged especially traffic accidents related to car usage and driving on the main roads, in addition to environmental pollution caused by car's exhaust system which contains the odorless carbon dioxide but when concentrated enough becomes lethal and that carbon dioxide can cause suffocation.

It was necessary to find legal and regulative solutions to protect the community from these problems. Thus, the need to find laws and regulations had emerged to insure the protection of individuals and the community from accidents and problems of using cars. Thus, traffic laws and regulations appeared aiming at protecting lives and properties from this iron machine driven by humans in roads and streets in front or between other humans. These laws guarantee to the community that this machine will be in good condition to run and that the person driving it is highly qualified, knows the driving, and traffic laws. They will also insure that roads are in good condition to be use by cars, pedestrians and other users. These are the traffic laws and regulations that the car's invention was the cause for their existence in order to arrive to the goal mentioned before. Within this context, we should mention that the first car accident in the world took place in 1769 when the steam vehicle, created by the French (Nicolas Kand) crashed on a curve and was running at almost 3 miles an hour.

Noting also that one of the oldest traffic laws that were presented in the world to organize traffic was the law issued in Britain on 1865 under the name of vehicles law, which put a speed limit to all cars by 4 miles an hour in open roads and 2 miles an hour in internal roads in cities and villages.

This law also obliged cars to assign a person holding a red flag to walk in front of the vehicle at daytime and a lantern giving a red light at night to warn pedestrians of vehicle's approach. In 1868, it was not necessary to use the flag or the lantern in front of cars on the roads but the flag holder and lantern were still necessary according to the law until 1896.

Among obligations included in vehicle's law issued in Britain in 1865, was the imposition of a fine called road tax on steam vehicles. It was always increasing to limit the use of vehicles to prevent any accidents.

Since then, the issuance of traffic laws and regulations has been presented in different countries of the world to organize traffic. They developed as the communities developed. Noting that with each development and increase of population in a community, the traffic of cars and other vehicles have increased and developed as well. This required developing traffic regulations in order to circulate the traffic and limit tension and jams caused by the huge and increasing number of vehicles every year and the increased numbers of traffic accidents expected to happen because of that.

The traffic law means a package of legal regulations issued by the specialized legislation authorities in a country to regulate and control the use of roads by pedestrians and cars in order to facilitate and simplify this use and preserve lives and properties.

The executive authority to explain and show the total or unclear regulations mentioned in the law usually issues traffic regulations and instructions. Traffic regulation is important, since it is part of everyone's life in the community without exception, as everyone uses the road whether as a pedestrian, driver or passenger in a car. The uses are repeated many times a day, which makes the traffic problem public, private and permanent. Directly or indirectly, everyone is thinking of it. Therefore, many studies have emerged aiming at circulating traffic so that everybody is able to get to work and back home and do their activities rapidly and smoothly without complications or wasting time and human and financial resources.

It is not limited to issuing laws, regulations and instructions to organize traffic, as mentioned in legal and traffic studies, but supporting studies and applications, have emerged aiming at aiding in solving traffic problems that as aforementioned are increasing and becoming more complex. These studies and applications were done using engineering science and administration studies, statistics, calculations and operational researches.

As a result, new studies and applications emerged in the field of traffic, especially traffic, road and car engineers, traffic statistics and calculation, and traffic operations, techniques and administration.

There is also an increase of using computers in traffic services. Using computers, traffic lights are programmed and operated. Computers are also used in traffic statistics based on gathering information about drivers, cars, accidents and traffic problems and analyzing them to know the reasons for accidents, eliminate them, and decrease their numbers.

The use of computers in operations rooms of the police departments occurs in different countries in which traffic controlling is required in a specific city or region. Officers are then being oriented to the traffic jam regions to do what is necessary in order to loosen the traffic.

Another common use of computer is gathering data related to traffic. It is data about drivers, driving licenses, vehicles permits and accidents their type, cause and consequences, and specifications, ages and nationalities of those who caused them, in addition to other information that would help to organize and operate the traffic and guarantee the safety of driving in the state.

Another common use of the computer is operating the operation room such as the one used to operate, coordinate and control the police and safety activities including traffic all day long. The importance of computers in traffic departments can be manifested at its best if we know the amount of traffic data gathered by police in the operations room. The responsibility of this room is to answer all the questions of police on patrols related to traffic such as the following: possibility to search for a driving permit by using the person's name, ID number or a file number; searching for a specific vehicle by identifying its tag number; date of registered and deported vehicles; details of unpaid tickets; and details of paid tickets. These operation facilities search for a part of individual's name, searching for a part of companies' name, keeping vehicle plates, etc.

It is important to answer these questions, especially, during an accident, or violating the traffic law. It immediately helps investigating the accident, identifying the car, or whoever was involved in that accident, also, to finalize the procedures. This would achieve traffic discipline, thus achieving on one hand traffic smoothness and on the other hand cleaning or evacuating the road from the car(s) involved in the accident, ensuring the road safety and ability to pass on it.

We should mention here the electronic photo and radar equipments used to capture violations done by those not abiding to the speed limit, or who pass red light in order to limit traffic accidents that hinder the traffic, decrease the ability to operate it, in addition its affect on the community with human and financial losses.

Awareness should be raised among the new generations to abide to traffic laws and manners. There are many aspects and ways to avoid traffic accidents, some are administrative and others technological. However, it is clear that the human factor is the main cause of the problem. The problem of the entire world nowadays is the driver, as he is the cause of traffic problems. His responsibility as human is the first element in decreasing accidents once he abides to traffic manners and directions.

Driving Safe and correct can be achieved through the clear understanding of traffic laws, regulations and implementing them at critical times in a correct manner. Improving technical skills of a driver may enable him to avoid these critical situations, which will lead at the end to safe driving.

Using the right manners while driving shall prevent all threats that a driver may face on the roads. These manners must always be part of his nature and should not be separate from his character.

In many circumstances, we may have noticed that some drivers exceed speeding limits on roads deliberately, for example, if we examine main roads, either they are 2 or 3 lanes, each lane is set for specific speed, therefore drivers must drive in a lane appropriate to their speed. Slow drivers must stay on the right lane to keep the traffic smooth, average speed drivers may stay in the middle lane, where he can pass other vehicles without exceeding the speed limit. Drivers going the speed limit or in a hurry, may stay on the left lane and be accounted for the consequences.

I may indicate here that safe driving may help in reducing the emission of polluting gases to the environment. Vehicles and other tools of transportation are the major cause of environmental pollution.

Studies have revealed that global warming in our world today has affirmed that an optimized method of driving vehicles may help in reducing car emission. Scientists think that fuel efficient cars and efficient methods of driving may help in the future to reduce gas emissions, which have been identified as the major cause of global climate change.

Scientists affirm that drivers may help in preventing these gas emissions through changing the way they drive their vehicles. Many reports state that means of transportation are accounting for 14% gas emission, and the share of cars and small trucks is about 45% of the total 14%. Counties that have signed the Kyoto treaty (convention) have stressed on putting more pressure on automobile manufacturers to make environmental friendly cars.

Drivers should abide by traffic regulations as a means for improving the environment. Neglecting these regulations will not only make drivers face legal accountability, but it will endanger their lives and the lives of others.

Driving the vehicle positively and slowly requires continuous planning and making the right decisions at the right time by applying these decisions carefully and attentively as there is no place on the road to a maneuver based on doubt and hesitation. If the maneuver is not completely safe, the driver should not do it at all.

Traditionally, vehicles speak through the use of their horn or using the light, and by the way the vehicle moves on the road. With today's crowded roads, the traditional means for anticipating a driver's intentions may be outdated.

There is an unmet need to enforce proper use of turn signals because unclear and unnecessary signaling puts the driver at risk of causing an accident. Moreover, overuse of the horn results in other drivers ignoring it as a signaling method of driver intent.

Concentration is the basis of a good driving and although it is an essential duty, but neglected in most times. Mental concentration while driving will guarantee noticing the finest details on the road that give you a big clue of what is going to happen. Neglecting that will lead to an undesired result. There is an unmet need for real-time alert monitoring of the vehicle driver.

A good driver makes his vehicle run smoothly and naturally, with the road including crossroads curves etc. as if he is reacting to his environment automatically. In fact, continuous concentration and thinking are the only ones leading to mastering driving.

Drivers should leave enough space between their vehicle and the others in front and on the sides. Accidents only happen because of badly assessed situations regarding assured clear distances.

Getting the driving license at an early age does not mean you drive well. Many of those who get a driving license early think they are free and do not abide the speed limit. In addition, preparation at driving school, although not comprehensive and short, does not take into consideration the necessity to inform students to abide to traffic laws such as speed limit and using seatbelts.

Many young people could consider abiding to traffic laws a kind of binding of their personal right and a pressure. Thus, we find that they are showing off proud to violate them, especially when it comes to stopping at stop signs, slowing down at the pedestrian paths, illegal passing, excess speed outside and inside the city, especially with the new cars that satisfy them in this issue.

Everyone is aware that traffic accidents are not a specific problem in a country but not in the other, it is a global problem that all organizations took interest in. it reached all groups in a community and harms the public interest more than the private ones. Its negative effects are represented in the painful human tragedies resulting from it, as for deaths and injuries that some turn into permanent handicaps, causing social threats that reach the individual and family, in addition to the financial losses which threaten the economic resources of all countries. Traffic accidents are the first reason for deaths according to the yearly global statistics reports. One could say that order comes to create a scientific global program supported by legislations and laws to insure its execution through real strategic plans that go together with, plans guaranteeing preserving lives and properties.

Thus, a traffic safety system solving the aforementioned problems is desired.

SUMMARY OF THE INVENTION

The traffic safety system includes a comprehensive control server with a mass storage unit, a main data collector with a main data collection mass storage unit, and a sub data collector with a sub-data storage unit. Also included are vehicle embedded sensors and infrastructure sensors embedded in various infrastructure components such as roadways, traffic lights street lamps, and the like All sensors are in network communication with the control server, main and sub data collectors. The control server, main and sub data collectors are all in operable communication with each other via the same network communications infrastructure. The entire networked system monitors and controls all activity (including vehicle activity) on roads equipped with the embedded sensors. The system generates alerts, which are sent to drivers warning them of laws, which are applicable to the controlled roadways. The control system enforces road activity that complies with the applicable roadway laws autonomously without human intervention.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
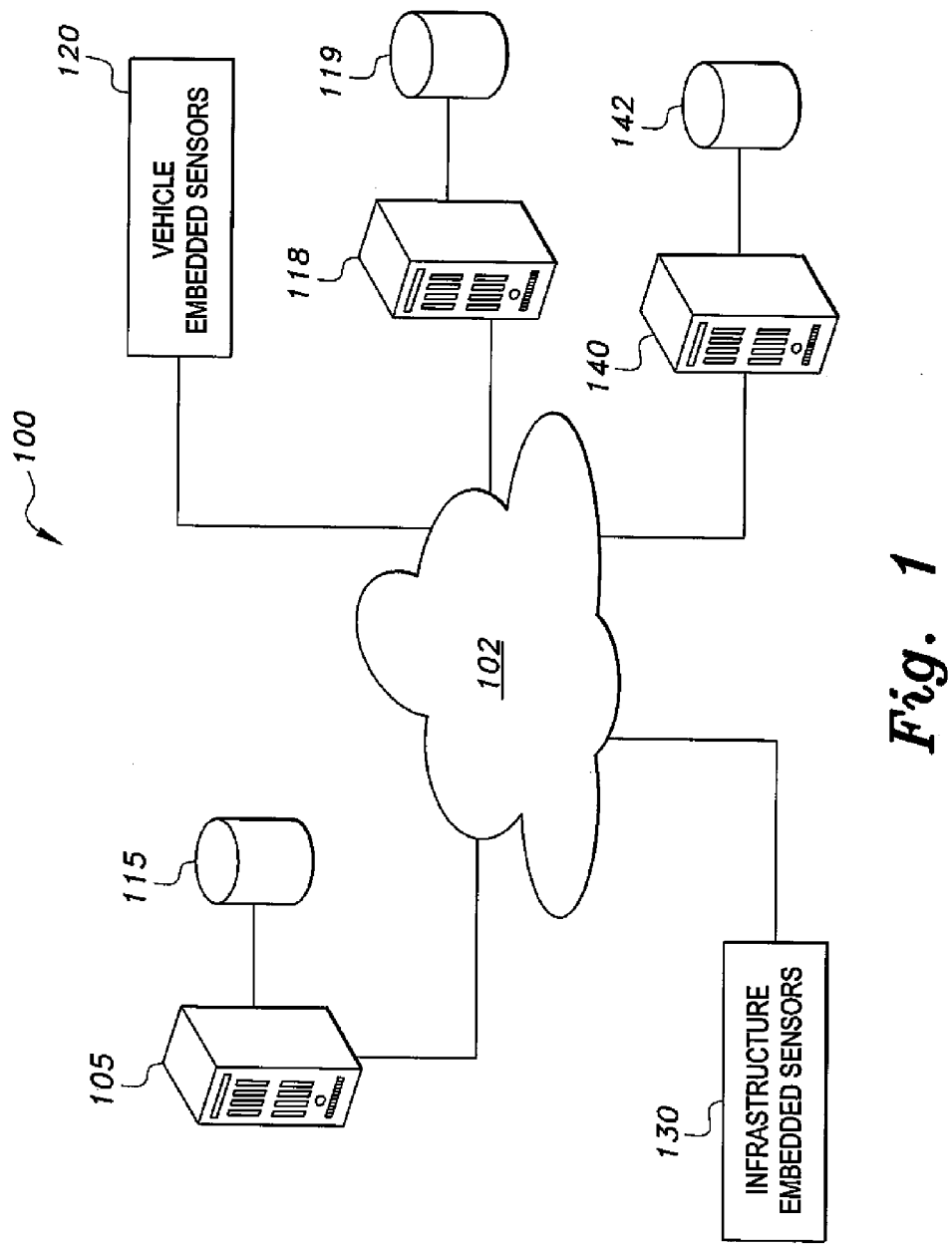
FIG. 1 is a block diagram showing the traffic safety system according to the present invention.

As shown in FIG. 1, the traffic safety system 100 includes at least one comprehensive control server 105 with a mass storage unit 115, at least one main data collector 118 with a main data collection mass storage unit 119, at least one sub data collector 140 with a sub-data storage unit 142. Also included are vehicle embedded sensors 120 and infrastructure sensors 130 embedded in various infrastructure components such as roadways, traffic lights street lamps, and the like. All sensors are in network communication with the control server 105, main data collector 118 and sub data collector 140.

The control server 105, main data collector 118 and sub data collector 140 are all in operable communication with each other via the same network communications infrastructure 102. The entire networked system 100 monitors and controls all road activity, including vehicle activity, on roadways having the infrastructure embedded sensors 130. The system 100 generates alerts, which are sent to drivers warning them of laws, which are applicable to the controlled roadways. The control portion of system 100 enforces road activity that complies with the applicable roadway laws autonomously without human intervention.

The system includes a traffic database that may be distributed among the various data storage units 115, 119 and 142. Control of vehicles and roadway infrastructure components by the system 100 in a manner that helps minimize traffic accidents is assisted by information provided by the traffic database. The present invention 100 contemplates utilizing the traffic database information to perform statistical analytics with respect to traffic accident variables. It is further contemplated that the statistical analytics can determine causes of the traffic accidents and adjust parameters of the system 100 to minimize reoccurrences. Thus a class of infrastructure embedded sensors 130 is designated to observe and report to the central server 105 all traffic accidents thereby building the traffic database upon which the statistical analytical tools can operate. The statistics are utilized to fine-tune the driving control portion of system 100. Moreover, the system 100 may be applied to mass-transit vehicles as well as individual automobiles.

Figure 2:
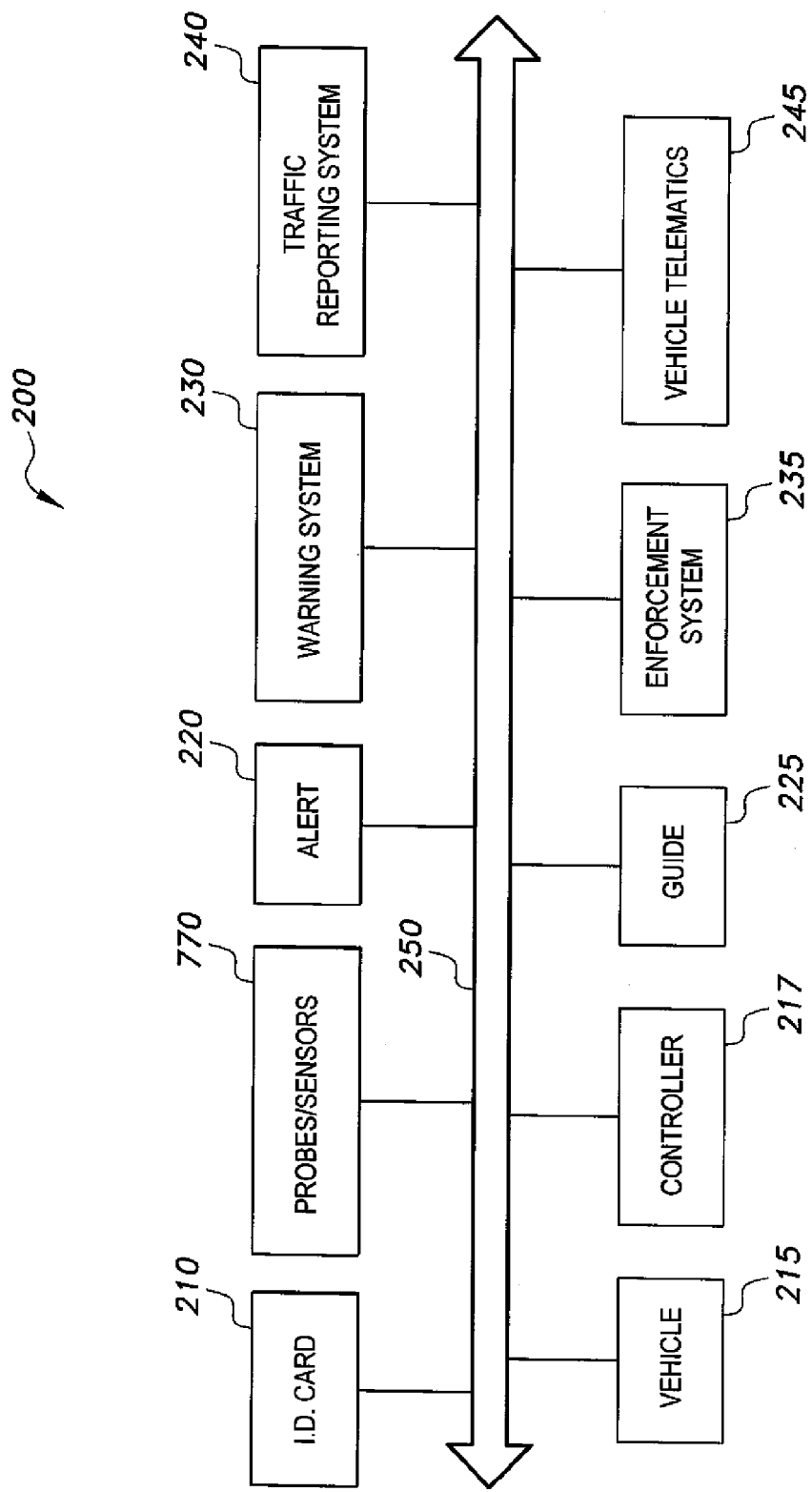
FIG. 2 is a block diagram showing subsystems of the traffic safety system according to the present invention.
Figure 9:
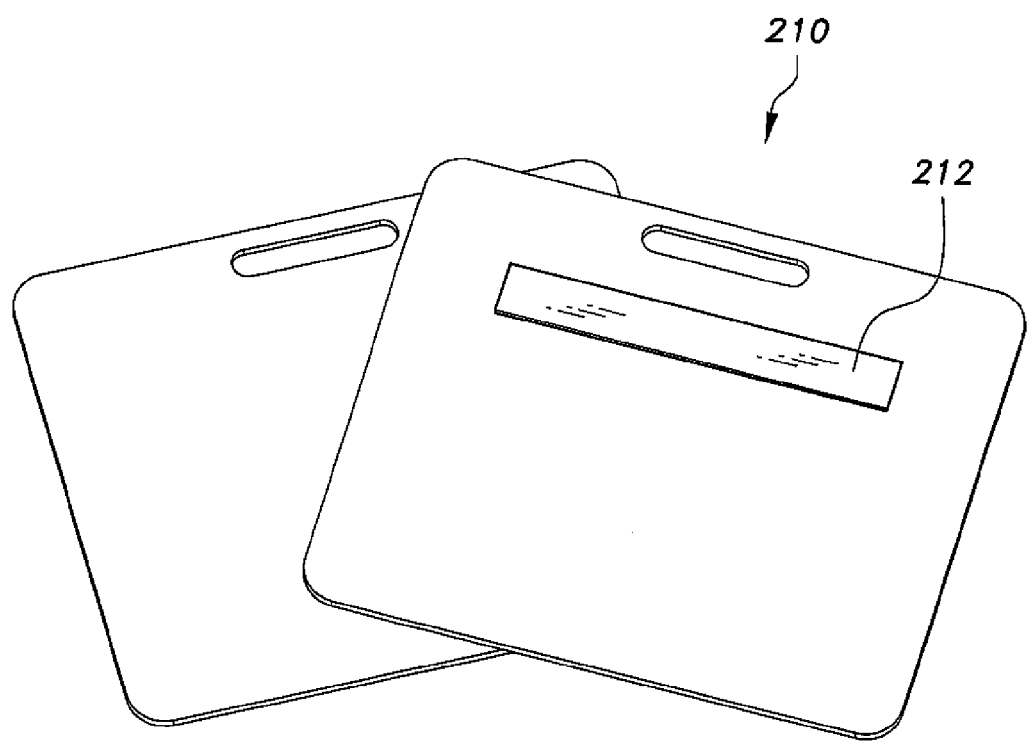
FIG. 9 is a perspective view of I.D. cards of the traffic safety system according to the present invention.

It should be understood that system 100 performs control functions, alert functions, guidance functions, warning functions and traffic legal enforcement functions which provide additional revenues by issuing fines to the appropriate driver when the sensors 130 or 120 detect an illegal operation of the vehicle. Determination of the appropriate driver is achieved via integration of system 100 with an electronic I.D. card 210 that positively identifies the driver of the vehicle. The I.D. card 210, as shown in FIG. 9, also includes a magnetic strip 212 with necessary electronic data stored thereon. Integration of the I.D. card 210 into system 100 assures that if the driver does not carry such card 210, he will not be able to operate the vehicle. Further, through I.D. card 210, fines and points are assigned to the correct driver. Moreover via card 210 the system 100 authenticates which driver is allowed to drive which vehicle(s). System integration 200 is shown in FIG. 2. Note that a high speed system bus or high speed network 250 allows communication among the various subsystems which include the I.D. card 210, the vehicle 215 the vehicle telematics 256, the controller 217 the guide 225, the enforcement system 235, the alert system 220, the probes/sensors 770 (probes/sensors 770 are a combination of sensors 130 and 120), and the traffic reporting system 240. High speed network also is in operable communication with network infrastructure 102 to transmit and receive data concerning operation of the vehicle 215. Controller 217 has circuitry that can control vehicle 215 via communication with control units disposed in the vehicle 215 to govern speed, brakes, and the like, based on control data sent from the comprehensive control server 105.

The infrastructure embedded sensors (probes) 130 transmit and receive vehicle data from vehicles traveling on the roadway. These probes 130 are installed on roads, pavements, lighting poles, light signals. Corresponding vehicle probes 120 are installed in the cars or other road vehicles. The infrastructure embedded sensors 130 and the vehicle embedded sensors 120 are a main information source for the system 100. Information from sensors 130 and 120 is used by controller 105 to control traffic signals, vehicles, and traffic density in both directions of traffic on any given roadway. Under control of system 100 via the comprehensive control server 105 the posted maximum and minimum speed limits are adaptive and are set responsive to traffic density, speed, road conditions, and the like. The system 100 causes these max and min speed limits to be displayed in a prominent location on or proximate the vehicle speedometer and also on a display portion of the vehicle telematics system 245.

Various classes of probes 120 may have connection wires connect with a variety of mechanical, electromechanical, and electrical systems of the vehicle in order to perform all alerts to the driver. For example, the driver is alerted when switching on high beams. The driver is alerted when not switching on lights in the evening. The driver is alerted when the alerts system is activated. The driver is alerted upon requesting to use light signals (in case of changing lanes or turning). The driver is alerted upon not drawing or fixing the safety belt of the driver and the passengers with no exception. The driver is alerted when a sudden breakdown of the vehicle due to electrical, mechanical, or electromechanical malfunction is imminent. The driver is alerted when a head or taillight is out. The driver is alerted when any signal light is out.

Figure 3:
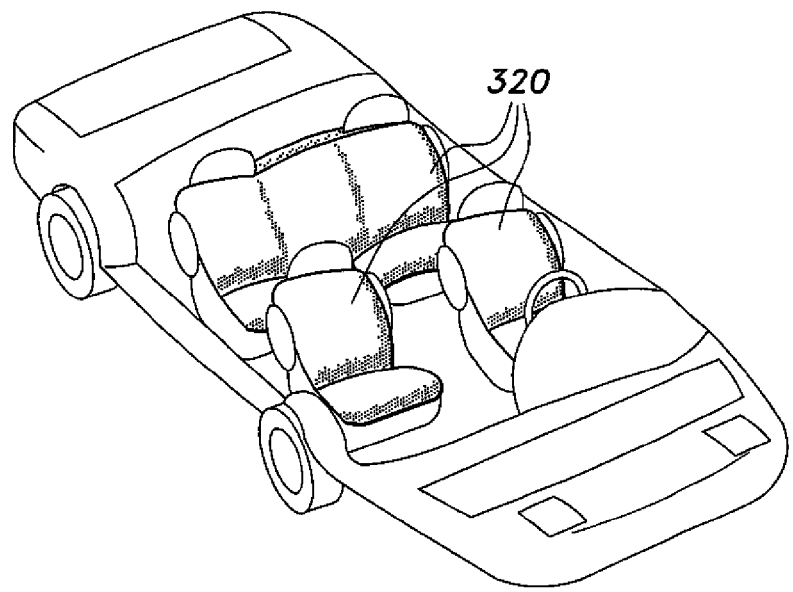
FIG. 3 is a perspective view of a vehicle interior showing the seat probes of the traffic safety system according to the present invention.
Figure 4:
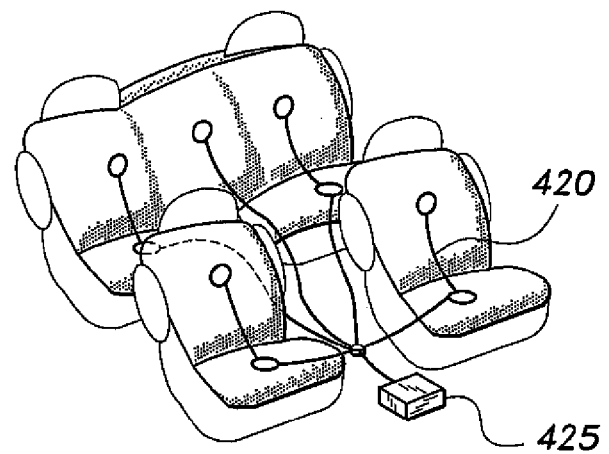
FIG. 4 is a perspective view of a vehicle interior showing the seat probes wired together according to the present invention.

As shown in FIG. 3, a seatcover style probe 320 is attached to the seat of the vehicle to alert the driver upon overloading the vehicle with passengers. Probe 320 also alerts the vehicle occupants upon not drawing or fixing the safety belt of any vehicle occupant. Probe 320 can also be fashioned as a steering wheel cover and include a heart beat measurement sensor fixed therein. In the steering wheel probe fitting, the probe issues a warning for drivers behind wheels for long hours, in particular truck, bus drivers and drivers travelling on expressway. Moreover, this feature operates in the system's display monitor fixed in the car. The heartbeat sensor has baseline regular heartbeats stored in it and compares it to the real-time heartbeat of the driver. If a heartbeat anomaly is detected, a warning is issued to the driver. The steering wheel probe may also be configured to require drivers to hold their thumbs on the steering wheel. An alternative seatcover sensor 420 having sensitive wires and connected to control box 425 accomplishes the same alerts as seatcover probe 320.

Additional class of sensor 120 may include a human oxygen sensor having an indicator attached to the display screen of telematics system 245. This oxygen type of sensor issues warning for drivers behind the wheels for long hours, in particular truck, bus drivers and drivers travelling on expressway, and may require a driver to pullover and raise oxygen levels in his blood as recorded in the oxygen level indicator.

Figure 8:
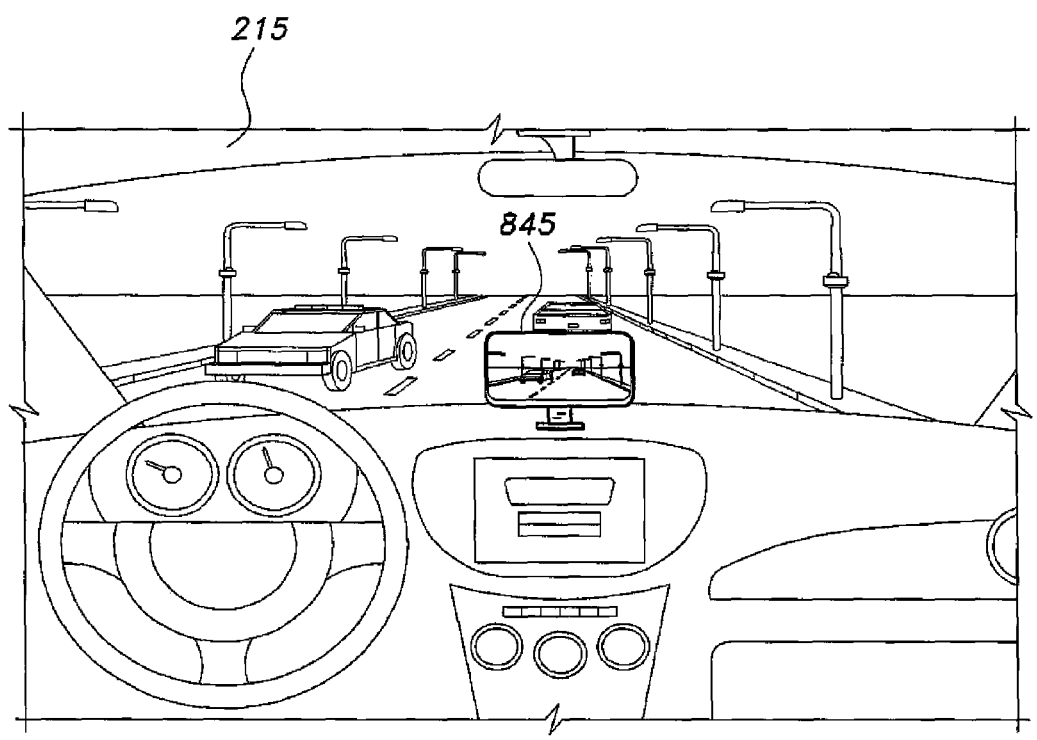
FIG. 8 is a plan view of a vehicle interior showing the display system of the traffic safety system according to the present invention.

As shown in FIG. 8, the vehicle 215 may have a display screen 845 which displays data to the driver after his being authenticated via a scan in the vehicle of the ID card 210. Display screen 845 has a variety of display functions including but not limited to displaying of traffic jams detected by probes 130. The screen 845 can display alerts to the driver with respect to traffic violations/fines, unsafe driving, and the like. In general, the screen 845 can display raw or processed data received from the internal or external probes 120 or 130. Moreover, the display screen 845 may have touchscreen capability in which based on touchscreen inputs the device 845 can send information to Information Center 105 responsive to data from the probes 120 and/or 130 upon traffic violation of the driver or the occurrence of an accident. Additionally, the screen 845 can show all GPS data completely. Typically the GPS data is made available from the telematics system 245 of the vehicle 215.

The system is distinguished by its easy installation and operation as it includes the sub data collector 140, defined by roadway authorities to be within a designated geographical area. There can be many sub data collectors 140 in disparate geographical locations, which feed the main data collector 118 in a spoke and hub configuration. The comprehensive control center 105 gets its data from the main data collector 118. The network 102 of the system 100 can establish connection with any relative institution such as air control center or the official or trading advertisement institutions.

Figure 5:
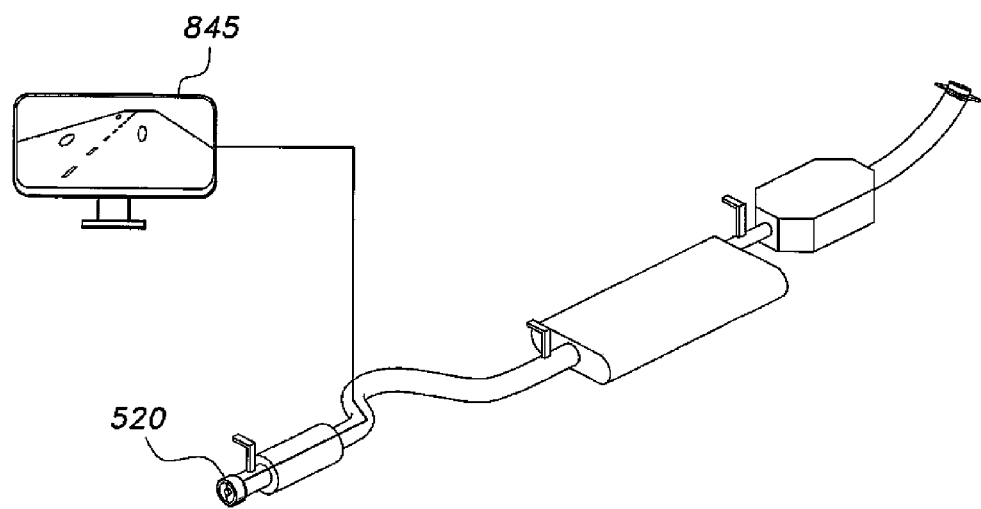
FIG. 5 is a perspective view of a vehicle exhaust system showing the exhaust probe of the traffic safety system according to the present invention.
Figure 6:
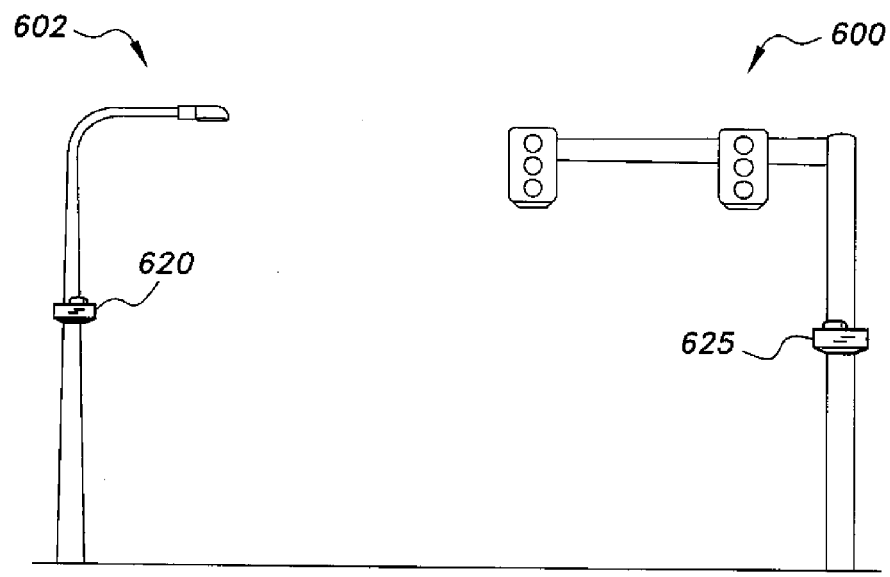
FIG. 6 is a plan view of a street installation of sensors on lamp posts and traffic lights according to the present invention.
Figure 7:
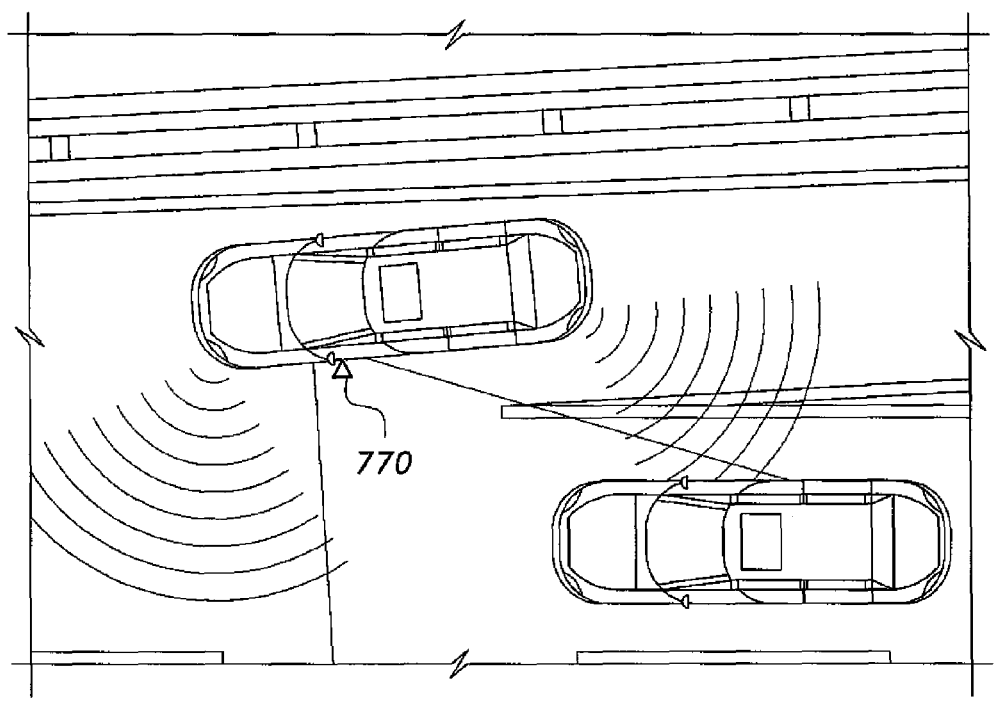
FIG. 7 is a top plan view of road vehicles showing placement of vehicle detection probes of the traffic safety system according to the present invention.
Figure 10:
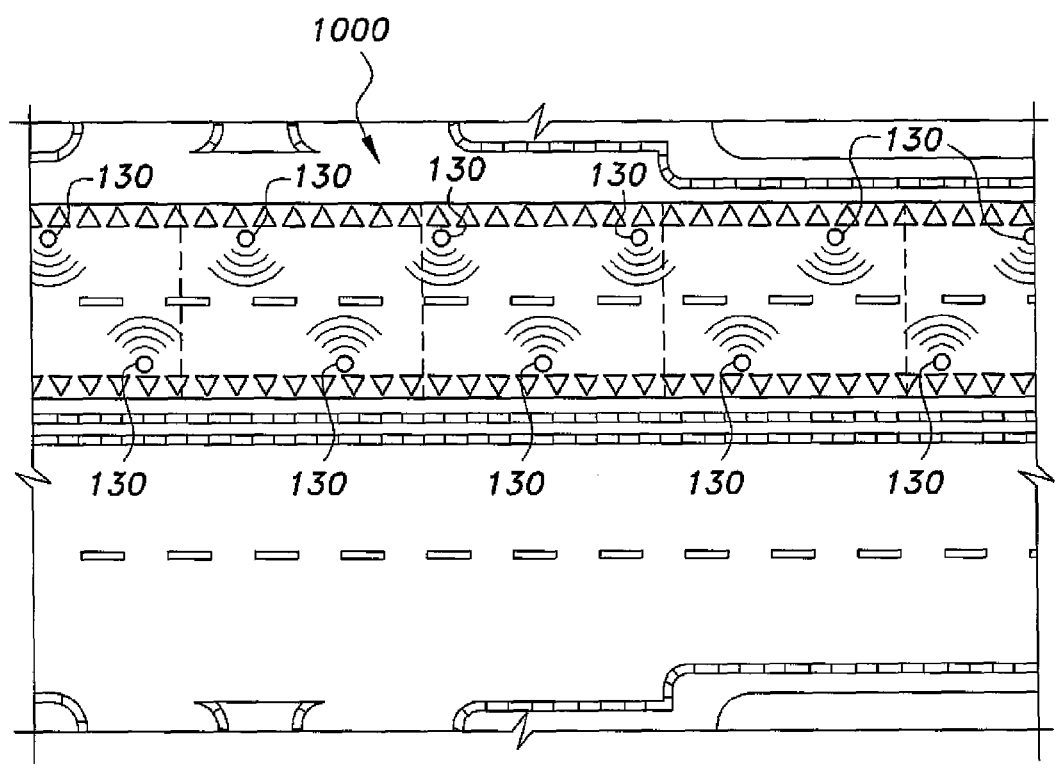
FIG. 10 is a top plan view showing road sensor placement of the traffic safety system according to the present invention.
Figure 11:
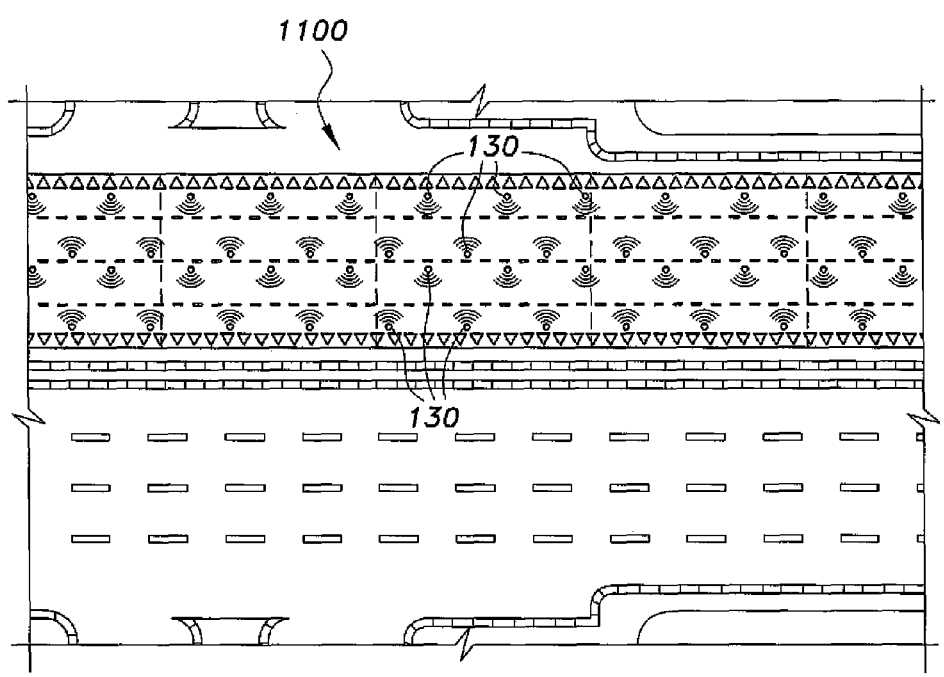
FIG. 11 is a top plan view showing road sensor placement of the traffic safety system according to the present invention.
Figure 12:
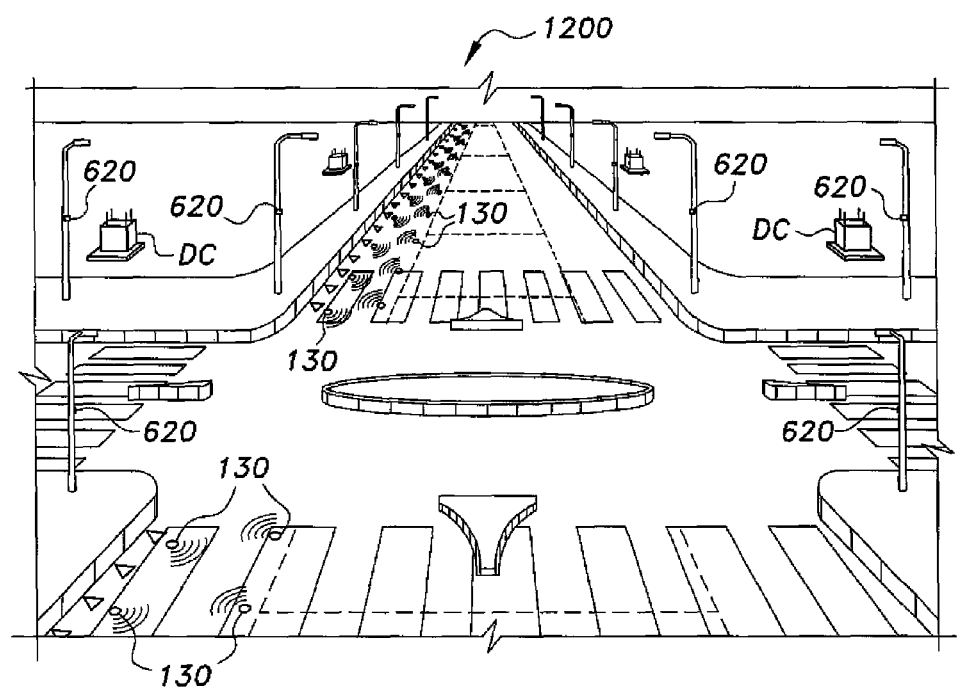
FIG. 12 is a top plan view showing road sensor placement of the traffic safety system according to the present invention.
Figure 13:
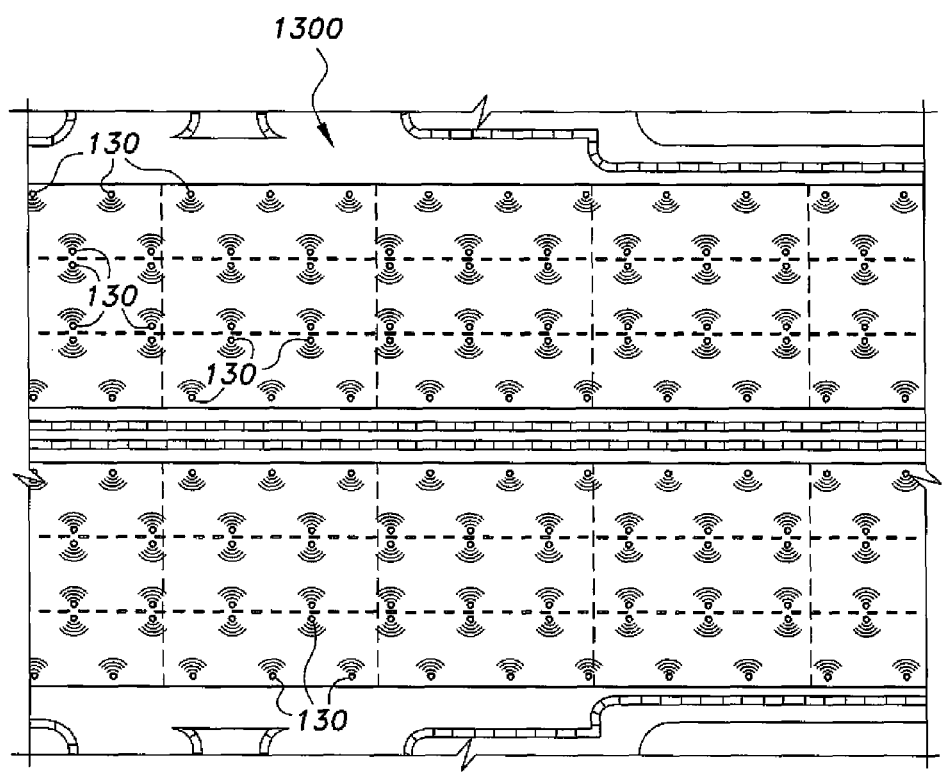
FIG. 13 is a top plan view showing road sensor placement of the traffic safety system according to the present invention.
Figure 14:
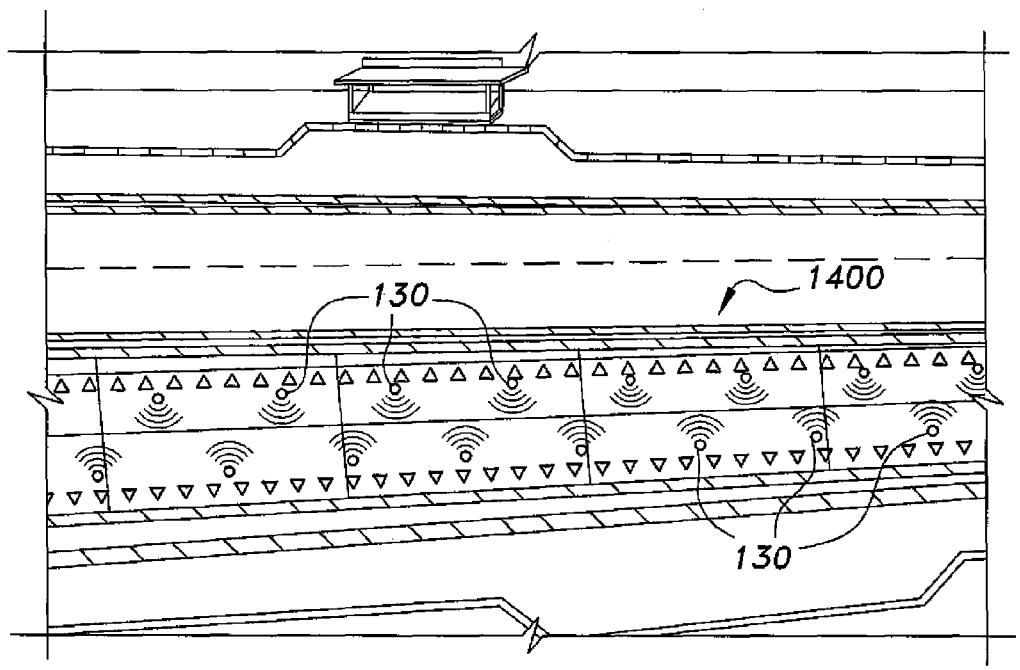
FIG. 14 is a top plan view showing road sensor placement of the traffic safety system according to the present invention.

The system 100 depends on a high speed network 102 for real-time exchange of data between vehicles 215, sensors 120, 130, data collectors 118, 140, and the comprehensive control server 105. It is contemplated that the system 100 can use existing infrastructure, i.e., roads, street lamps 602, street lights 600 (shown in FIG. 6), and the like. As shown in FIG. 7, sensor class 770 can detect whether it is safe for a vehicle to perform a lane change. A class 620 of infrastructure sensors 130 can be provided on the street lamp 602. A class 625 of infrastructure sensors 130 can be provided on traffic signal 600. Existing electricity power networks can be used to power the infrastructure embedded sensors 130. Sensors 130 include roadway sensors in configurations such as shown in FIGS. 10 1000, 11 1100, 12 1200, 13 1300, and 14 1400. More specifically, as shown in FIG. 10, two lane highway 1000 has probes 130 alternately disposed on opposite sides of the lane marker. With respect to the roadway 1000 the probes 130 are diagonally opposed. This pattern is repeated for the four lane highway 1100 shown in FIG. 11, except now, the diagonal opposition occurs per each of the four lanes. As shown in FIG. 12, roadway 1200 has the embedded infrastructure sensors 130 distributed on entry and exit from a traffic circle. Moreover lamp-post class 620 of sensors are disposed on the lamp-posts. Additionally data collectors DC are disposed along side the roadway (these may be sub data collectors 140 or main data collectors 118). Divided six lane roadway 1300 is shown in FIG. 13. Pairs of sensors 130 are disposed laterally in-line proximate the lane markers and are facing in opposite directions. Sensors 130 disposed proximate the edge of the roadway are positioned facing opposite sides of the roadway and are placed diagonally opposing the in-line lane proximate sensors. FIG. 14 shows a narrowing two lane configuration 1400 where the sensors 130 are disposed on opposite sides of the road, their emitters facing the opposing side while alternating diagonally along the roadway 1400. As shown in FIG. 5, a lower rear facing on board sensor 520 can be mounted on the vehicle's tailpipe and routed to the display 845.

Information flow between the vehicle 215 and data collectors 118 and 140 and control centers 105 may be without limitation achieved by methods such as e.g., GPRS, GSM, Ethernet, Internet, or any method to achieve best possible connection and transfer of information and the possibility of changing among the previously mentioned methods.

Information circuitry may send its readings and any data required to control centers 105 throughout data collectors 118, 140 in mini collection centers via electric power transfer lines for low and medium data speed requirements.

The system 100 includes encryption in order to protect the privacy of the drivers, vehicles, and other users after all data relevant to them has been registered by the system 100. The secure encryption and authentication features of system 100 prevent road users, such as drivers who do not carry driver license, or unauthorized to drive by vehicle's owner, or unauthorized by the authority from driving on the roadways under control of the system 100. The system 100 has error prevention circuitry that prevents errors in transferring, reading and controlling outgoing and incoming data, or registering violations and reports arising from the human intervention in this procedure that is automatically executed in the system without any human intervention this is based on the registration of all applicable regulations and laws.

The system 100 helps the authorities to direct road users by sending necessary data in emergency cases such as weather changes, accidents, closure of roads for any reasons such as accidents, or traffic jam. They can send such data to road users of concerned road, or roads that interfere therewith.

Authorities may also send particular data to a vehicle driver inviting him to pay his violations or notifying him that he is driving in an irregular or violating manner. The system 100 can help the traffic authorities terminate his driving license in the event of accumulation of traffic violations after a certain period, and it can automatically send citations to him via binary communication for controlling and sending data without any human intervention.

The system 100 has speech generation circuitry that also sends voice warning to notify the drivers that his vehicle is approaching areas that may require special concerns and attention such as a school area. The system 100 also determines whether the school is open or on vacation, after identifying it and registering its schedule in the system's central control server 105.

Using vehicle and roadway sensor data for distance calculations, the system 100 also sends warnings to the driver and helps him to determine the legal distance between his vehicle and the one in front of him. This is another feature of the present invention. When entering data of vehicle's owner or the authorized driver, therefore vehicles information and dimension is entered in the system, particularly (height, weight: with and without any loads) and utilize comparators against baseline or predetermined values in order to alert vehicle's driver that his vehicle has an overweight load or advise him when he is on an inappropriate lane to his vehicle height such as high vehicle or low ones going in the same lane. For example, high vehicle in the lane for a long distance may block the view of another vehicle of low height where the vehicle with same height may not have enough view The system 100 can discover traffic jams and control the traffic by guiding the vehicles towards alternative roads through incoming accurate information. The system helps discovering, deactivated traffic lights and their location and detects the sudden stopping of any vehicle and its location regardless of the cause by giving a special signal for such cases through sensors fixed on roads and squares.

Programs and data systems are compatible for all computer programs used for the issue of violations and analytic reports. The programs are also compatible for all digital visual and audio information systems. The system provides daily or momentary analysis and reports after establishments by competent authorities with regard to all roads, specific road statistics relevant to violations and violator, specific area, and specific day.

The system 100 keeps all warning letters under the same conditions and dates as references whether they expired or still valid. Programs associated to the system determine, through reports, road needs such as missing communication sensors to improve the capacities of data collection in order to grant the system a distinguished performance.

The system 100 locates any vehicle reported stolen that cannot be stolen through conventional methods after the installation of this system. The only way to steal such vehicles is to transport them by means of winches that require considerable time. The system 100 can identify the thief through the vehicle's transmitter. This feature makes stealing almost impossible. The system 100 can help the application of the automatic deactivation of the car or the cancellation of the card.

The system 100 receives official announcements issued by the Authority that are extremely important to send by voice as well as commercial announcements. The system 100 automatically allows the renewal of the drivers' license without referring to the authority or acquiring an operation permit in case the driver paid all due violations through the registration of the payment receipt.

The system 100 enables competent authorities to accurately calculate the number of cars passing on each road where the system registers the number of cars to take necessary measures regarding periodic maintenance and all necessary procedures to build alternative roads or exists or increase the number of road lines.

The system 100 transfers data through a communication unit fitted in the dashboard of vehicle 215. Such units enable to driver to communicate with sensors distributed along roads and with operation programs associated to the system. The dashboards of recently manufactured cars replaced by a reception and a transmission unit as a system's signals or the use of part of the front wind shield as a screen, or by a display screen if the cars previously manufactured.

The installation of the system 100 and accessories requires knowledge of the new system 100. The system 100 accepts identification and registration of vehicle drivers using the system 100. Data communication lines for the system are detection and adopted. Sensors 120, 130 in the system 100 are detected and registered. Roads in the system are detected and registered.

After operating the system in the main data collector 118, system operators send signals to the data sub-collectors 140. Then the system 100 determines, on different phases, all vehicles and drivers on the roads and automatically identifies any driver of vehicle. Thus, the communication is established between all data sub-collectors 140, main data collector 118 and system control center 105 for operation of the system 100.

Phase one activation includes deployment of the system in areas of special nature, such as the capital streets that are normally crowded worldwide, and areas with a great number of schools, hospitals and highways.

The approval and operation of such project through many techniques, such as the transfer of digital information, waves and channels from the system 100 to receiving and transmitting sensors 120 fitted in the vehicle, infrastructure embedded sensors 130 on roads, sidewalks and intersections and other, where the system 100 guarantees the prompt reception and transmission of information without any errors relying on the classification of communication systems after its reliance on the features of transmitted information, the nature of the used transmission channel and the method of amendment. It relates the vehicle to the road and the road to the information connectors that store and analysis abnormal cases and violations differentiating them from sound and regular driving cases after registering in the system all applicable laws namely severe violations that lead to fatal mistakes such as Excessive speed, Reverse driving on a public road or highway, Driving the wrong way, Running or ignoring red lights at intersections, driving in a negligent manner, not abiding by the strikes or meaning thereof and other severe violations.

It is well know that some simple traffic violations may lead to severe accidents and that some accidents may occur between two vehicles due to the fault of a third one that does not get into the crash. In such cases, the system 100 can identify the situation, after the issue or request of an accident report from any vehicle involved in the crash driven by licensed or authorized persons.

The system 100 will help apply the law on the driver of the vehicle and not the owner where each driver is provided with an identification card that connects to the system 100 when the driver holds the wheel to which the procedure is limited. The use of the driver's identification card 210 is the main connector to the system 100 through the circle of identification of the vehicle driver's behaviors.

The system 100 sends voice warning to the vehicle driver regarding any matter that may constitute a danger or may cause and accident such as, Getting close to areas of special nature such as a school area where the system 100 determines whether the school is open or on vacation. The system 100 notifies the driver by saying: (Warning, schools/hospitals area). The system 100 also warns when driving on the left lanes with a speed that is not adequate to the condition of the road. Approaching an intersection or roundabout, the system notifies the vehicle's driver by saying: (Warning, you are entering an intersection area, please determine your path). Driving on a road that has not covered by the system, the system 100 notifies the vehicle driver that the road has not covered by saying: (This road has not been covered by the secure system, please abide by traffic regulations). Driving in the same direction as ambulance cars, emergency police vehicles or official convoys, the system 100 notifies the vehicle's driver by saying; (Please change path for the ambulance/official convoy/emergency vehicle). This feature is accomplished by the system 100 utilizing all sensor data, including GPS data to determine trajectory of the civilian vehicle and trajectory of the emergency vehicle.

The system 100 may be fitted with additional features and characteristics, such as the installation of sensors, or the use of wire connection in high and low beam lights, as well as directional signals and horn fitted in the vehicle so the system can notify the vehicle's driver when used in an appropriate manner or the opposite, or notify him with the necessity to use them in a methodical manner and for a sufficient time. sensors 120, linking between the vehicle, the system 100, the driver's identification card 210, the storage center, reception and transmission of information, control flashing traffic signals with regard to measuring the density of vehicles in each direction, maximum or minimum speed limits after sensing the vehicles density and issue signals of maximum or minimum speed limits on the display screen of the vehicle dashboard.

It is known to all drivers that most of expressway that links countries and cities are not provided with light posts therefore drivers depend on other vehicle's light coining from the opposite direction particularly road with sharp curve and roads on valleys where vision at day time also may be poor, there are some drivers that do not abide with street lanes (if available) which states no passing zone, this may lead to severe accidents and deadly ones, these sensors sends signals of an approaching car through the attached device on the dashboard as mentioned previously.

The system 100 also enables patrols responsible for road monitoring to identify and detect any vehicle driver that was able to drive or start the vehicle in an illegal manner by means of the special system fitted in the patrol car where the system may reveal all illegal cases.

It is to be understood that the present invention is not limited to the embodiments described above, but encompasses any and all embodiments within the scope of the following claims.

I claim:

1. A traffic safety system, comprising:
   at least one comprehensive control server connected to an existing network communications infrastructure;
   first means for data storage connected to the at least one comprehensive control server;
   at least one main data collector connected to said existing network communications infrastructure, said at least one main data collector relaying data it receives to said at least one comprehensive control server;
   second means for data storage connected to the at least one main data collector;
   at least one sub data collector connected to said existing network communications infrastructure;
   third means for data storage connected to the at least one sub data collector;
   infrastructure sensors embedded in infrastructure components of a roadway, said infrastructure components including traffic lights, street lamps, and said roadway, said infrastructure sensors being connected to said existing network communications infrastructure, said infrastructure sensors sensing information about a vehicle operable on said roadway, said vehicle information including whether said vehicle is operating on said roadway in a manner consistent with laws applicable to said roadway, said infrastructure sensors sending said vehicle information to said at least one sub data collector, said at least one sub data collector reporting said vehicle information to said at least one main data collector;
   vehicle embedded sensors embedded in said vehicle operable on said roadway, said vehicle embedded sensors being operable to communicate via said existing network communications infrastructure, said vehicle embedded sensors being in operable communication with mechanical, electromechanical, and electronic subsystems of said vehicle, said vehicle embedded sensors reporting to said at least one sub data collector information about a vehicle operable on said roadway;

said vehicle including means for receiving data from said at least one comprehensive control server, wherein said comprehensive control center data received by said vehicle alerts occupants of said vehicle of whether said vehicle is being operated in compliance with said laws applicable to said roadway.

2. The traffic safety system according to claim 1, further comprising a controller on board said vehicle, said controller accepting vehicle speed, braking, and steering commands from said at least one comprehensive control server wherein said vehicle is controlled according to said commands from said at least one comprehensive control server.

3. The traffic safety system according to claim 1, further comprising:
   an electronic I.D. card registered with said at least one comprehensive control server;
   authentication circuitry in said vehicle, said authentication circuitry permitting operation of said vehicle by the holder of said electronic I.D. card only upon verification from said at least one comprehensive control server that said electronic I.D. card holder is authorized to drive said vehicle.

4. The traffic safety system according to claim 3, further comprising means for denying operation of said vehicle by said electronic I.D. card holder if said electronic I.D. card holder has a predetermined number of outstanding traffic violations.

5. The traffic safety system according to claim 4, further comprising means for controlling traffic density on said roadway based on traffic information forwarded to said at least one comprehensive control server by said at least one main data collector.

6. The traffic safety system according to claim 5, further comprising means for adaptively issuing minimum and maximum speed limits to an operator of said vehicle based on said traffic information forwarded to said at least one comprehensive control server.

7. The traffic safety system according to claim 6, further comprising means for alerting said vehicle operator when to use headlights and turn signals on said vehicle.

8. The traffic safety system according to claim 7, further comprising:
   means for measuring heartbeat of said vehicle operator; and
   means for warning said vehicle operator when a heartbeat irregularity is detected.

9. The traffic safety system according to claim 8, further comprising:
   means for measuring oxygen consumption rate of said vehicle operator; and
   means for warning said vehicle operator when said oxygen consumption rate of said vehicle operator falls below a predetermined threshold.

10. The traffic safety system according to claim 9, wherein said existing network infrastructure consists of one of, GPRS, GSM, ETHERNET.

11. The traffic safety system according to claim 9, wherein said existing network infrastructure comprises a combination of, GPRS, GSM, ETHERNET.

12. The traffic safety system according to claim 9, further comprising a voice alert that based on registration information stored and accessible to said at least one central control server, informs said vehicle operator when the vehicle is approaching a school.

13. The traffic safety system according to claim 12, further comprising:
   means for alerting the vehicle operator when an assured clear legal distance between the vehicle and other vehicles on the roadway is not being maintained;
   means for alerting the vehicle operator when the vehicle has an overweight load; and
   means for alerting the vehicle operator when the vehicle's height may obstruct vision of vehicle operators in low profile vehicles traveling in the same traffic lane.

14. The traffic safety system according to claim 13, further comprising means for alerting said vehicle operator when said vehicle is carrying a weight load exceeding a predetermined maximum weight load for said vehicle.

15. The traffic safety system according to claim 14, further comprising means for generating traffic and roadway analytic reports based on traffic information stored in said first, said second, and said third means for data storage.

16. The traffic safety system according to claim 15, further comprising means for alerting said vehicle operator of an approaching car around a blind section of said roadway.

17. The traffic safety system according to claim 16, further comprising means for alerting said vehicle operator same path avoidance instructions when an emergency/police mobile unit is proximate said operator's vehicle.

18. The traffic safety system according to claim 17, further comprising means for determining whether a third vehicle caused an accident between a first and second vehicle, said determining means being based on said roadway analytic reports.

19. The traffic safety system according to claim 18, further comprising:
   means for locating said operator's vehicle when it has been stolen; and
   means for identifying a thief of said operator's vehicle, said identifying means being based on sensor data from said vehicle embedded sensors.

20. The traffic safety system according to claim 19, further comprising means for automatically renewing license of said vehicle operator when said vehicle and said operator have a clean driving/operating record.

* * * * *